United States Patent

[11] 3,563,157

| [72] | Inventor | Conrad Lenz |
| | | Annenhofstrasse 2, 805, Freising, Germany |
| [21] | Appl. No. | 767,627 |
| [22] | Filed | Oct. 15, 1968 |
| [45] | Patented | Feb. 16, 1971 |

[54] AUTOMATIC BREWING PLANT
9 Claims, 4 Drawing Figs.

| [52] | U.S. Cl. | 99/278 |
| [51] | Int. Cl. | C12c 7/10 |
| [50] | Field of Search | 99/278, 276, 277, 277.1, 277.2, 29, 30, 36, 38; 195/128, 129, 130, 131, 132 |

[56] References Cited
UNITED STATES PATENTS

| 1,206,495 | 11/1916 | Aronowitz | 99/277.1 |
| 2,306,717 | 12/1942 | Dolenz | 99/277.1 |
| 3,062,656 | 11/1962 | Agabalianz | 99/276X |
| 3,232,211 | 2/1966 | O'Malley | 99/278 |

*Primary Examiner*—Robert W. Jenkins
*Attorney*—Low and Berman

ABSTRACT: A brewing plant equipped with controls which automatically feed a set amount of mash to vessels, keep the mash in the vessels at closely controlled temperatures for predetermined times, transfer the mash between the vessels, and ultimately discharge it to a lautertub. The manifold control functions are distributed between a master control unit and auxiliary control mechanisms, each of which controls more than one aspect of the brewing process and is itself controlled by the master unit.

Fig.1b

AUTOMATIC BREWING PLANT

BACKGROUND OF THE INVENTION

This invention relates to the brewing of beer, and particularly to the control of process conditions during brewing.

Temperature, time, quantitative relationships of ingredients, and other variables must be controlled closely in brewing plants if reproducible results are to be achieved. It has been customary heretofore to rely mainly on the skill and diligence of operators in maintaining the desired process conditions, and automation, if any, was limited to individual process steps. Conditions in a brewery are not favorable to delicate instruments, and early failure of conventional control equipment in continuous operation under conditions of high humidity and mechanical stresses is almost inevitable.

The object of the invention is the provision of control equipment capable of automatically operating a brewing plant under closely maintained conditions, yet rugged enough to have an almost unlimited useful life.

A more specific object is the provision of control equipment whose moving parts are relatively few in number, heavy and operative regardless of minor changes in dimensions.

SUMMARY OF THE INVENTION

Characteristically, a brewing plant has a plurality of vessels adapted to hold a liquid such as mash. The condition of the liquid in one or more of the vessels must be sensed, and the operation of the plant includes the adjustment of the temperature of the liquid and its transfer between the vessels for changing its level in one vessel.

The improved controls of the invention include a control member which may be moved through several sequential positions. A setting device, such as an electric switch, responds to movement of the control member by generating a setting signal representative of a set value which the condition of the liquid is desired to assume. An actuating mechanism is connected to the setting device and to the operating elements of the plant in such a manner as to actuate the operating elements in a direction to change the condition of the liquid toward the desired set value.

An END gate is operatively connected to a device which senses the condition of the liquid and to the setting device and responds to the signal of the latter and to a simultaneously sensed condition of the liquid which corresponds to the set value by generating a compliance signal, that is, a signal indicating that the operating elements have complied with the setting signal.

A deactivating mechanism is caused by the compliance signal to deactivate the actuating mechanism and to move the control member into its next position.

Other features, additional objects and many of the attendant advantages of the invention will be readily appreciated as the same becomes better understood by reference to the following detailed description of a preferred embodiment when considered in connection with the attached drawing.

DESCRIPTION OF THE PREFERRED EMBODIMENT

Figure 1:
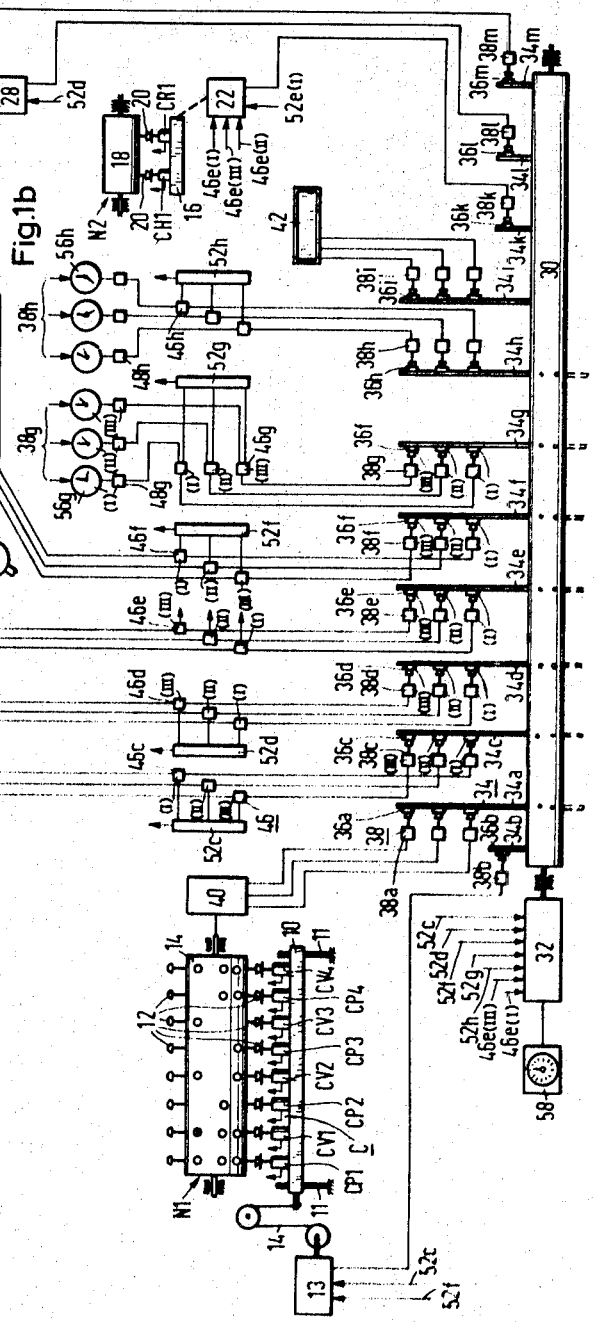
FIG. 1 shows a brewing plant according to the invention in diagrammatic representation.

Referring now to the drawing in detail, and initially to FIG. 1, there is seen a mash tub G1 and a mash tun G2. A pipe L1 connects the tub G1 with mash making apparatus M, the flow of mash in the pipe L1 being controlled by a pump P1 and a shutoff valve V1. Mash can be passed in a direction from the tub G1 to the tun G2 through a pipe L2 provided with a pump P2 and a shutoff valve V2, and in the opposite direction by a pump P3 and a shutoff valve V3 in a pipe L3 which bypasses the pump P2 and the valve V2. A discharge pipe L4 equipped with a pump P4 and a valve V4 permits mash to be withdrawn from the tub G1.

The respective contents of the tub G1 and the tun G2 can be agitated by means of stirrers R1, R2 electrically energized from a power line E, and heated by means of coils H1, H2 supplied with steam from a steam pipe system D through control valves VH1, VH2. The liquid levels in the tub G1 and the tun G2 are sensed by floats S1, S2 connected to liquid level indicators $50c$, $50f$ by means of cables K1, K2. The temperatures in the tub G1 and tun G2 are sensed by thermometers TH1, TH2.

The flow of material through the pipes L1, L2, L3, L4 is automatically started and stopped by means of a control mechanism $N_1$ of a type described more fully in my copending application, Ser. No. 513,612, filed on Oct. 25, 1965, now Pat. No. 3,424,878. It has a carrier bar 10 supporting switches CP1—CP4 which provide the actuating signals for the electric motors of the pumps P1 to P4 and switches CV1—CV4 which provide corresponding signals for the solenoid operated valves V1—V4 respectively.

The switches on the bar 10 are operated in the desired sequence by means of abutments 12 which radially project from a rotary control rod or drum 14. The drum 14 is rotated about an axis parallel to the bar 10 by an electric motor in a position selector 40, and the several abutments 12 are arranged in groups, the members of each group being located in a common radial plane for cooperation with the same switch on the bar 10 and all abutments 12 are located in several equiangularly spaced axial planes so that different sets of abutments may be presented to the switches on the bar 10 in respective angular positions of the drum 14.

The bar 10 is vertically slidably mounted on guide rails 11 and may be raised and lowered by means of lifting cables 14' partly wound on cable drums driven by a reversible motor 13, only one cable 14' and associated elements being shown in the drawing.

Control mechanisms $N_2$, $N_3$, similar to the mechanism N, control the agitation and heating of the mash in the tub G1 and the tun G2. The control mechanism N2 has a carrier bar 16 which supports switches CH1 and CR1 for the solenoid actuator of the steam valve VH1 and the motor of the stirrer R1 in the tub G1. The switches are operated by means of abutments 20 on a control rod or drum 18 when their carrier bar 16 is lifted by a motor 22 in the manner described with reference to mechanism N1.

Figure 2:
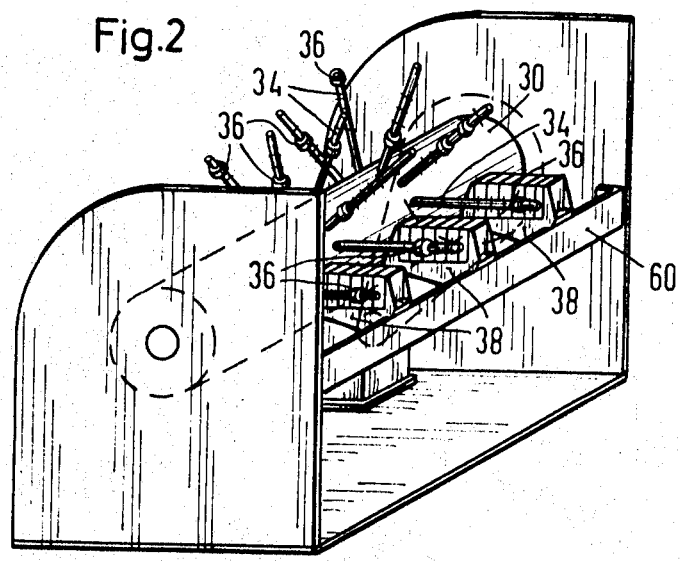
FIG. 2 is a perspective view of the master control unit of the apparatus of FIG. 1.
Figure 3:
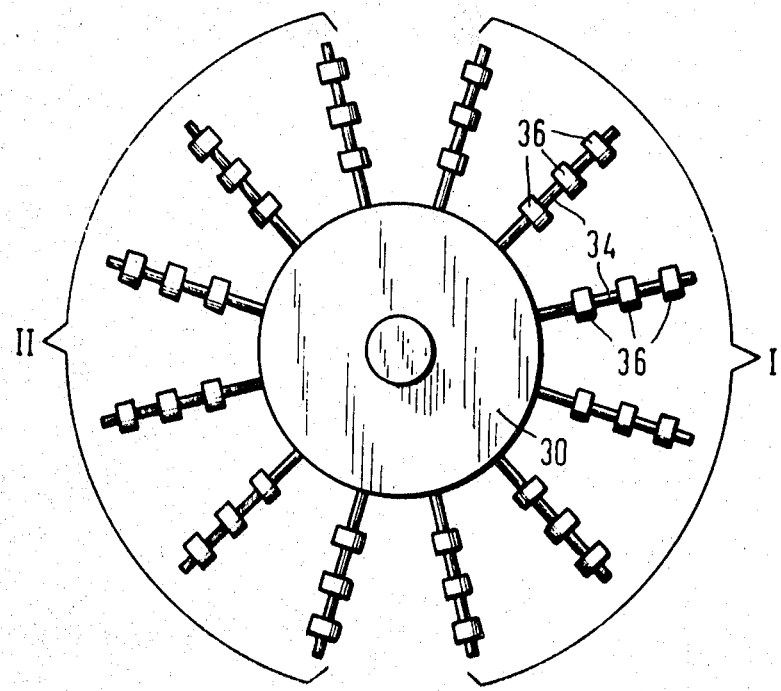
FIG. 3 shows a portion of the device of FIG. 2 in front elevation.

The carrier bar 24 of the control mechanism N3 carries the control switches CH2 and CR2 for the steam valve VH2 and the stirrer R2 in the tun G2, and are operated by abutments 26 on a control drum 27 when lifted against the abutments by an electric motor 28. The rhythm in which the control mechanisms N1, N2, N3 are operated is governed by a master control unit whose basic structural features are best seen in FIGS. 2 and 3. It has a rotatably mounted shaft or drum 30 equipped with a stepping or indexing drive 32. Twelve groups of radial rods 34 project from the shaft or drum 30 in six, equiangularly spaced axial planes and carry abutments 36 which move in three cylindrical surfaces during the rotation of the shaft or drum 30. For the sake of convenient pictorial representation, the several radial rods 34 in a common radial plane are jointly represented in FIG. 1 by individual rods $34a$ to $34m$, shown in FIG. 1 in a common axial plane, and their abutments 36 are correspondingly designated $36a$ to $36m$, Roman numerals I to III denoting abutments mounted on rods in a common radial plane at different distances from the axis of the shaft 30. Cooperating elements are similarly identified by Roman numerals. There is normally one abutment on each rod as is shown in FIGS. 2 and 3. The rods 34 are attached to the drum 30 by threaded engagement with tapped holes in the drum surface, and may be shifted on the drum surface as needed. Similarly, the abutments 36 may be arranged on the rods 34 to suit the desired mode of operation.

When the shaft 30 turns, the abutments 36 operate microswitches 38 (38a to 38m) mounted on the supporting frame 60 of the master unit. Only three banks of microswitches and a few rods 34 have been shown in FIGS. 2 and 3 in order not to crowd the drawing. The actual number and disposition of the rods 34, abutments 36 and switches 38 will presently become apparent, and may be modified in an obvious manner if so required.

The rods 34a in a first common radial plane carry abutments 36a for operating microswitches 38a. They control the position selector 40 for the control drum 14 of the control mechanism N1. The drum 14 thus is angularly shifted whenever one of the microswitches 38a is closed, as we will be described later with reference to FIG. 4. The rods 34b in another radial plane close a microswitch 38b to energize the lifting motor 13 of the control mechanism N1 in selected angular positions of the shaft 30.

The microswitches 38c which are operated by abutments 36c on radial rods 34c in a third radial plane select the liquid level in the tun G2, as will be described below in more detail. The temperature in the tun is set by the microswitches 38d when operated by the rods 34d. The temperature in the vat G1 is similarly set by the microswitches 38e, and the liquid level in the vat G1 by the microswitches 38f. Microswitches 38g select the length of certain processing steps, and the length of other processing steps is set by microswitches 38h. The angular position of the shaft or drum 30, and thus the condition of the entire plant is indicated on a luminous display board 42 when microswitches 38i are operated by the associated abutments 36i on radial rods 34i.

The lifting motor 22 of the control mechanism N2 can be operated by a microswitch 38k, and the motor 28 of the control mechanism N3 by the microswitch 38l as mentioned above with reference to the switch 38b. The microswitch 38m operated by abutments 36m on the rods 34m in the tenth radial plane of the master unit triggers the start of a new mash making cycle in the mash making apparatus M through a control unit 44.

The microswitches 38c which select the liquid level in the mash tun G2 are respectively connected with the inputs a of AND gate 46c also connected with microswitches 48c arranged in a vertical row. The liquid level indicator 50c moves along the row of the switches 48c to operate the same. The output terminals of the AND gate 46c are connected to the input terminal of an OR gate 52c which can energize the lifting motor 13 of the control mechanism N1.

When the liquid level of the mash tun G2 coincides with the level set by an associated abutment 36c on a switch 38c, the corresponding AND gate 46c feeds a pulse as a compliance signal to the OR gate 52c which energizes the motor 13 so as to lower the carrier 10, and thereby to open those switches mounted on the carrier which were previously engaged by abutments 12, and thus to stop the previously operating pump P2 or P3, and to close the corresponding shutoff valve V2 or V3. The OR gate 52c, which functions as a deactivating mechanism, furthermore feeds a pulse to the stepping or indexing drive 32 of the shaft 30, and the shaft is thereby indexed forward by one step.

The thermometer TH2 essentially consists of three thermally operated switches 48d whose respective contacts engage each other at different temperatures. The switches 48d are connected to the inputs of respective AND gate 46d also connected to the three microswitches 38d. When a rod 34d closes a microswitch 38d associated with a closed thermal switch 48d, the corresponding AND gate 46d transmits a pulse to an OR gate 52d which in turn energizes the lifting motor 28 of the control mechanism N3 and the stepping drive 32. The carrier bar 24 is lowered so that the switches CH2 and CR2 are opened, and the steam supply to the tun G2 is interrupted at the valve VH2. Simultaneously the stirrer R2 is deenergized. The shaft 30 is indexed one step forward.

Similarly, the microswitches 38e and thermal switches 48e of the thermometer TH1 are connected by AND gate 46e, each connected with the lifting motor 22 of the control mechanism N2. Two of these AND gate are additionally connected with the stepping drive 32. The mode of operation of the microswitches 38e will be apparent from the preceding description of the switches 38d.

The microswitches 38f cooperate with AND gate 46f, microswitches 48f, the level indicator 50f, and an OR gate 52f as described above with reference to the microswitches 38c to operate the lifting motor 13 of the control mechanism N1 and the stepping drive 32 in response to the liquid level in the mash tub G1.

The microswitches 38g and switches 48g operated by electric timers 56g are connected to AND gate 46g which transmit pulses to an OR gate 52g. The latter triggers the stepping drive 32. The microswitches 38g are also connected to the associated timers 56g to start the timer 56g when the corresponding microswitch 38g is being closed by an abutment 36g on an arm 34g. Each AND gate 46g thus transmits a pulse to the OR gate 52g after the closing of the corresponding microswitch 38g with a delay set on the timer 56g.

The microswitches 38h, timers 56h, timer-controlled switches 48h, AND gate 46h, and an OR gate 52h are connected to trigger the stepping drive 32 as described in the preceding paragraph.

The shaft 30 may be set manually by means of a position selector 58 to a desired starting position of its operating cycle. The rods 34 arranged on the shaft 30 in one arc I of 180° may thus be equipped with abutments 36 for programming one operating cycle, while the rods 34 in the other arc II may be arranged for a different cycle, the two cycles being selected by suitably setting the starting position on the position selector 58.

The control unit 44, not itself relevant to this invention, may consist of a group of linked timers and switches which automatically operate the mash making apparatus M in a manner known in itself. An automatically metered amount of malt is soaked in a similarly dosed amount of water for a period set on a timer, the start of the operation being triggered by the control unit 44. Upon completion of the soaking process, the malt is crushed between rollers and further diluted with water prior to being admitted to the mash tub G1 by the pump P1.

Figure 4:
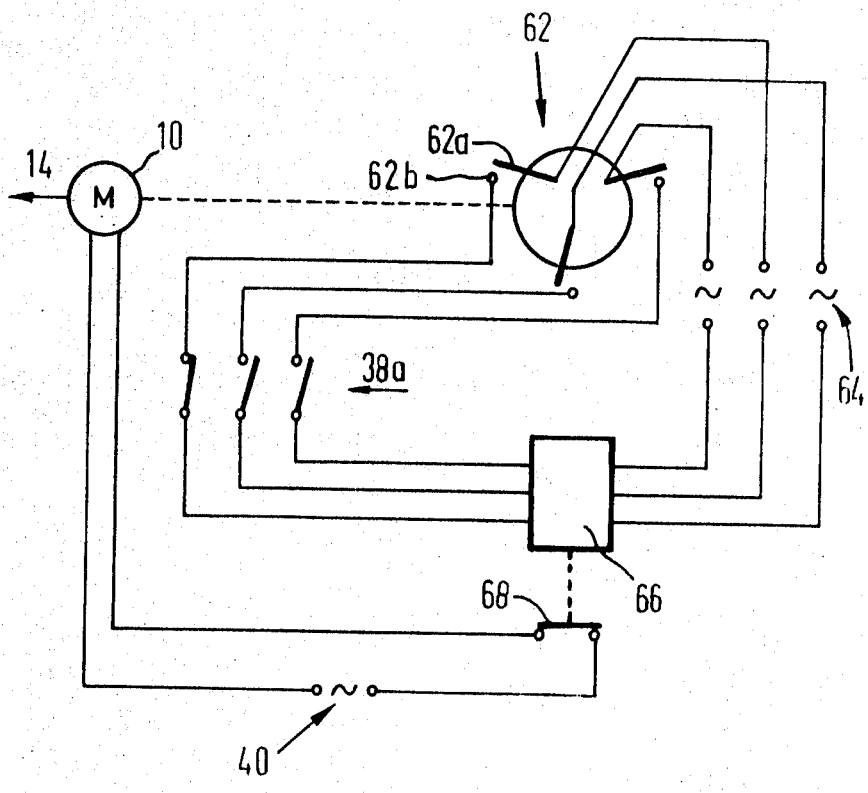
FIG. 4 is a schematic of an element of the plant of FIG. 1.

A position selector 40 of a type suitable for use in the apparatus of FIG. 1 is illustrated in FIG. 4 in a conventional manner. It includes a rotary switch 62 shown to have three contacts 62a mounted on the switch rotor and cooperating with respective fixed contacts 62b conductively connected to respective first terminals of the microswitches 38a, of which one is closed. The movable contacts 62a of the switch 62 are connected through nonillustrated slip rings and respective independent power supplies 64 to three parallel coils of a relay 66 which are also connected to the second terminals of the microswitches 38a. When one of the coils in the relay 66 is energized, the relay attracts its armature to open a switch 68 in the energizing circuit of a motor 70 which drives the rotor of the switch 62 and the control drum 14 in the mechanism N1.

The switches 38a are mechanically coupled in a known manner, not specifically illustrated so that each switch when closed by engagement with an associated abutment 36a remains closed until another switch of the same bank is actuated. Similar mechanical linkages are provided in the other banks of microswitches 38 illustrated in FIGS. 1 and 2. In the illustrated condition of the position selector 40, the motor 70 is energized and turns the switch 62 and the drum 14 clockwise through an angle of about 100° until the closed switch 38a can energize the relay 66 when the associated circuit is closed in the switch 62, whereupon the motor 70 is deenergized. It is energized again when a switch 38a, which is open in the illustrated position, is closed by the associated abutment 36a, so that three different positions of the drum 14 can be selected.

While only three movable and fixed contacts have been shown on the switch 62 in FIG. 4, and only three microswitches 38a in FIGS. 1 and 4, the number of switches in each bank of the master control unit may be increased or decreased as needed, and the necessary modification of the positioning unit will be obvious.

Relays, current supplies and similar accessories have been largely omitted from the drawing for the sake of simplicity. It will also be appreciated that some or all of the electrical circuits illustrated and described may be replaced by their hydraulic or pneumatic equivalents, as it partly described in my aforementioned copending application.

The following example of a brewing cycle for light beer performed on apparatus such as that described above with reference to FIGS. 1 to 4 will further explain spatial and functional relationships of the elements illustrated. The cycle includes the following steps:

(1) Charging the tub G1 with mash
(2) Heating the mash in the tub G1 to 62° C
(3) Partial transfer of the mash to the mash tun G2
(4) Heating of the mash to 65° C.
(5) Rest at 65° C for saccharification
(6) Heating of the mash in the tun G2 to 72° C
(7) Second saccharification
(8) Heating the mash in the tun G2 to 100° C
(9) Boiling for 20 minutes
(10) Return of mash to the tub G1
(11) Temperature adjustment
(12) Transfer of mash to straining vat (not shown)

The apparatus of the invention automatically performs the steps enumerated as soon as the position selector 58 is set for the appropriate starting position and the apparatus is started by closing a nonillustrated main switch in its power supply.

The mash making apparatus M is started first by the microswitch 38m which triggers the control unit 44, as explained above. The rotary control rod or drum 14 initially is in a position in which the switches CV1 and CP1 are closed by the raised carrier bar 10 and cooperating abutments 12. The valve V1 is open and the pump P1 operates so that the mash discharged from the mash making apparatus M enters the mash tub G1 through the pipe L1.

The abutment 36f(III) is in engagement with the corresponding microswitch 38f(III) to provide a signal when the contents of the tub G1 reach a volume of 66 hectoliters. When the float S1 rises to actuate the corresponding switch 48f(III), a pulse from the OR gate 52f causes the carrier bar 10 to be lowered by the motor 13, as partly described hereinbefore, and the shaft 30 to be indexed by one angular step by its drive 32.

In the resulting second angular position of the shaft 30, the microswitch 38k is closed so that the carrier bar 16 is raised and the switches CH1 and CR1 are closed to open the steam valve VH1 and to energize the motor of the stirrer R1. The mash in the tub G1 is being heated and stirred.

The abutment 36e(I) simultaneously closes its switch 38e(I) in such a manner that a pulse is transmitted from the AND gate 46e(I) to the motor 22 when the thermally operated switch 48e(I) is closed at 62° C. The carrier bar 16 is lowered, and the heating coil HL and the stirrer R1 are deactivated thereby. Simultaneously, the drive 32 is energized to advance the shaft 30 by one angular step into its third angular position.

The position selector 40 is operated by a closed microswitch 38a to turn the drum 14 until abutments 12 face the switches CP2 and CV2. Simultaneously, the carrier bar 10 is lifted so that the valve V2 is opened and the pump P2 is energized. Mash is transferred from the tub G1 into the tun G2.

The microswitch 38c(I) is closed to produce a signal at a liquid level in the tun G2 which corresponds to a volume of 30 hectoliters. The pulse generated by the OR gate 52c in the proper position of the level indicator 50f causes the motor 13 to lower the carrier bar 10 and the shaft 30 to be indexed into its fourth position.

The microswitches 38k and 38l are closed to raise the carrier bars 16, 24 of the control mechanisms N2, N3, whereby the switches CH1, CR1, CH2, CR2 are closed. The contents of the tub G1 and of the vat G2 are heated and stirred. The maximum temperature to be reached is set at 65° C in the vat G1 by the abutment 36e(II), and in the tun G2 by the abutment 36d(I). When the desired temperature is indicated by the thermometers TH1, TH2, the heating coils H1, H2, and stirrers R1, R2 are shut off. The shaft 30 is advanced to its fifth position.

The timer 56g(I) is set for a ten minute run. It is now being started by the microswitch 38g(I). When the time set has elapsed, the OR gate 52g signals the stepping drive 32 to turn the shaft 30 onto its sixth angular position.

In this position, the heater H2 and stirrer R2 are again activated by the microswitch 38k, and a target temperature of 72° C is set in the tun G2 by the closing of the microswitch 38d(II). When this temperature is reached, a pulse from the OR gate 52d to the motor 28 and the drive 32 causes the heating coil H2 and the stirrer R2 to be deactivated, and the shaft 30 to be moved into its seventh position.

Another rest period of 20 minutes is set on the timer 56g(II) which is now started by the microswitch 38g(II). After 20 minutes, the OR gate 52g emits a pulse which causes the shaft 30 to enter its eighth position.

The switches CH2, CR2 are closed by the carrier bar 24 being raised as the microswitch 38e is actuated by an abutment 36e. A temperature of 100° C is set in the tun G2 by the microswitch 38d(III). When that temperature is reached, the OR gate 52d signals the motor 28 and the stepping drive 32 to shut off the steam supply to the tun G2, to stop stirring, and to advance the shaft 30 to its ninth position.

For the subsequent boiling step, the microswitch 38l is again closed by an abutment 36l, a boiling time of 20 minutes is set by means of the timer 56g(III) and the microswitch 38g(III), and boiling is terminated when the OR gate 52g deactivates the control mechanism N3 and advances the shaft 30.

In the tenth position of the shaft 30, the positioning device 40 sets the rotary drum 14 to present abutments 12 to the switches CP3 and CV3, and the carrier bar 10 is raised by its motor 13. The valve V3 is opened and the pump P3 is energized to return mash from the tun G2 to the vat G1. The ultimate mash volume in the vat G1 is set at 66 hectoliters by the microswitch 38f(III) and an associated abutment 46g(III) which cause the OR gate 52F to operate the motor 13 and the drive 32 when the microswitch 48f(III) is closed by the lever indicator 50f. The carrier bar 10 is lowered to stop the pump P3 and to close the valve V3. The shaft 30 is turned into its 11th position.

Unless the temperature of the mash in the vat G1 is 76° C at this stage, it is to be raised to that temperature by the closed microswitch 38k which provides steam for the coil H1 and causes the stirrer R1 to be operated. If the initial temperature was 76° C, or when this temperature is reached by supplemental heating, the microswitch 36e(III) cooperates with the thermally operated switch 48e(III) to deactivate the heating coil H1 and the stirrer R1 by means of the control mechanism N2, and to move the shaft 30 into its last position.

The mash is now ready for transfer to the straining vat or lautertub, not itself seen in the drawing. The position selector 40 is set to present abutments 12 to the switches CV4 and CP4, and the carrier bar 10 is raised to open the valve V4 and to energize the pump P4. The mash is pumped out of the tub G1 into the straining vat for further processing.

The microswitch 38f(I) is set for complete emptying of the vat G1 when the level indicator 50f closes a microswitch 48f(I). The resulting pulse from the OR gate 52f causes the carrier bar 10 to be lowered, and the shaft 30 to be returned to its starting position. A new cycle can be started.

The control arrangement shown and described above may be expanded or modified in an obvious manner simultaneously or separately to control operation of a brewing unit including a lautertub and wort kettle, or operation of a malthouse. It will be noted that some control mechanisms are provided but not utilized in the afore-described brewing cycle. They are availa-ble for other operations. the control arrangement of the invention can automatically operate any brewing equipment which includes at least two vessels, one or more being equipped with a temperature adjusting device, such as a heating or cooling coil, liquid level and temperature controls, and means for transferring a liquid between the two vessels. Because the necessary combinations and premutations of individual control settings are too numerous to be handled by a single control mechanism such as the master control unit associated with the shaft 30, groups of control operations are performed by the auxiliary control mechanisms N1,N2,N3. The number and complexity of the latter may be varied as needed.

I claim:

1. In a brewing plant including a plurality of vessels adapted to hold a liquid; sensing means for sensing the condition of a liquid in one of said vessels; operating means for changing said condition and including adjusting means for adjusting the temperature of said liquid and transferring means for transferring said liquid between said vessels for changing the level of said liquid in said one vessel; and control means for controlling said operating means, the improvement in the control means which comprises:

a. a control member arranged for movement through a plurality of sequential positions;
   b. setting means responsive to said movement of said members for generating a setting signal representative of a set value of said condition;
   c. actuating means connected to said setting means and to said operating means for actuating said operating means in a direction to change the condition of said liquid toward the set value;
   d. an AND gate operatively connected to said sensing means and to said setting means and responsive to said setting signal and to a simultaneous condition of said liquid sensed by said sensing means and corresponding to said set value for generating a compliance signal; and
   e. deactivating means responsive to said compliance signal for deactivating said actuating means and for moving said control member from one to another one of said positions thereof.

2. In a plant as set forth in claim 1, said control member being arranged for rotation about an axis, and said positions thereof being angularly spaced relative to said axis, said control member carrying a plurality of spaced abutment members, said setting means and said actuating means including a plurality of switching means located adjacent said control member for engagement by said abutment member during said movement of the control member.

3. In a plant as set forth in claim 2, said abutment members being arranged in axially spaced groups, the members of each group being located at different distances from said axis in a common plane radial relative to said axis, and members of each group being axially aligned with corresponding members of other groups; and said switching means constituting a plurality of groups of switching means, the members of each group of switching means being radially aligned with each other.

4. In a plant as set forth in claim 2, said switching means including electrical switches.

5. In a plant as set forth in claim 2, said sensing means including a plurality of electrical switches.

6. In a plant as set forth in claim 5, said switching means including electrical switches, and said AND gate having respective inputs connected to an electrical switch of said switching means and to an electrical switch of said sensing means.

7. In a plant as set forth in claim 1, said actuating means including an auxiliary control mechanism comprising a carrier, a plurality of signal generators on said carrier, abutment means, moving means responsive to said movement of said control member for engaging said abutment means with said signal generators and for thereby generating a plurality of actuating signals, said operating means being connected to said signal generators and responsive to said plurality of actuating signals for simultaneously changing a plurality of values of said condition.

8. In a plant as set forth in claim 7, said abutment means including a support and a plurality of abutment members spacially mounted on said support, position selector means for positioning said support in each of a plurality of positions in which selected abutment members engage corresponding ones of said signal generators when said abutment means and said signal generator are engaged by said moving means, and means on said control member connected to said position selector for selecting the position of said support in response to the position of said control member.

9. In a plant as set forth in claim 7, said operating means including heating means for heating the liquid in said one vessel and stirring means for stirring said liquid, said operating means responding to said plurality of actuating signals for simultaneously heating and stirring said liquid.